(12) United States Patent
Jang et al.

(10) Patent No.: US 7,996,209 B2
(45) Date of Patent: Aug. 9, 2011

(54) METHOD AND SYSTEM OF GENERATING AND DETECTING CONFUSING PHONES OF PRONUNCIATION

(75) Inventors: Jyh-Shing Jang, Taipei (TW); Pai-Pin Wang, Taipei (TW); Jiang-Chun Chen, Dadu Township, Taichung County (TW); Zheng-Hao Lin, Yilan (TW)

(73) Assignee: Institute for Information Industry, Taipei (TW)

( * ) Notice: Subject to any disclaimer, the term of this patent is extended or adjusted under 35 U.S.C. 154(b) by 849 days.

(21) Appl. No.: 12/068,830

(22) Filed: Feb. 12, 2008

(65) Prior Publication Data

US 2009/0150154 A1 Jun. 11, 2009

(30) Foreign Application Priority Data

Dec. 11, 2007 (TW) ................................ 96147276 A

(51) Int. Cl.
*G10L 15/00* (2006.01)
(52) U.S. Cl. .............................. 704/8; 704/243; 704/251
(58) Field of Classification Search .............. 704/8, 243, 704/251
See application file for complete search history.

(56) References Cited

U.S. PATENT DOCUMENTS

| 4,500,872 | A | * | 2/1985 | Huang | ............................ | 341/28 |
| 5,751,905 | A | * | 5/1998 | Chen et al. | ..................... | 704/254 |
| 2001/0010039 | A1 | * | 7/2001 | Yang | ............................. | 704/239 |
| 2005/0203738 | A1 | | 9/2005 | Hwang | | |
| 2006/0074664 | A1 | * | 4/2006 | Lam et al. | ..................... | 704/255 |
| 2007/0033042 | A1 | | 2/2007 | Marcheret et al. | | |

FOREIGN PATENT DOCUMENTS

TW 200506764 2/2005

OTHER PUBLICATIONS

Ming et al., "Application of error pattern analysis assisted in English pronunciation learning,"The Association for Computational Linguistics and Chinese Language Processing—Conference on Computational Linguistics and Speech Processing, 2005, pp. 1-18.

(Continued)

*Primary Examiner* — Daniel D Abebe
(74) *Attorney, Agent, or Firm* — Muncy, Geissler, Olds & Lowe, PLLC

(57) ABSTRACT

A method of generating and detecting confusing phones/syllables is disclosed. The method includes a generating stage and a detecting stage. The generating stage includes: (a) input a Mandarin utterance; (b) partition the Mandarin utterance into segmented phones/syllables and generate the most likely route in a recognition net via Forced Alignment of Viterbi decoding; (c) compare the segmented phones/syllables with a Mandarin acoustic model; (d) determine whether a confusing phone/syllable exists; (e) add the confusing phone/syllable into the recognition net and repeat step (b), (c), and (d) when the confusing phone/syllable exists; (f) stop and output all generated confusing phones/syllables to a confusing phone/syllable file when a confusing phone/syllable does not exist. The detecting stage includes: (g) input a spoken sentence; (h) align the spoken sentence with the recognition net; (i) determine the most likely route of the spoken sentence; and (j) compare the most likely route of the spoken sentence with the target route of the spoken sentence to detect pronunciation error and give high-level pronunciation suggestions.

21 Claims, 7 Drawing Sheets

OTHER PUBLICATIONS

Liang, Min-Siong et al., "Data-Driven Approach to Pronunciation Error Detection for Computer Assisted Language Teaching," Seventh IEEE International Conference on Advanced Learning Technologies (ICALT), Jul. 18-20, 2007, pp. 359-361.
Chen, Jiang-Chun et al., "Automatic Pronunciation Assessment for Mandarin Chinese," IEEE International Conference on Multimedia and Expo (ICME), 2004, pp. 1979-1982.
Lin, et al. Article, "Chinese-English Transliterated-Term Pair Extraction with Confusion Matrix", Word-Transliteration Alignment, 2003, 9 pages.

* cited by examiner

METHOD AND SYSTEM OF GENERATING AND DETECTING CONFUSING PHONES OF PRONUNCIATION

RELATED APPLICATIONS

This application claims priority to Taiwan Application Serial Number 96147276, filed Dec. 11, 2007, which is herein incorporated by reference.

BACKGROUND

1. Field of Invention

The present invention relates to a method and system for generating and detecting confusing phones. In particular, the present invention relates to a method and system of generating and detecting Mandarin confusing phones.

2. Description of Related Art

In recent years, as both computer speed and speech technologies advance rapidly, applications related to speech processing for our daily life uses have also increased substantially. One promising direction is computer-assisted spoken language learning for non-native speakers.

Language learning can be roughly divided into four parts: listening, speaking, reading, and writing. For the speaking part, currently there is no efficient learning tools that can provide Mandarin learners with both automatic evaluation and high-level feedbacks. The pronunciation training tools available on the market simply partition and analyze a given Mandarin utterance to give a score, without giving possible confusing phones for a phone that is mispronounced. Moreover, these tools are unable to provide effective feedbacks/suggestions considering the users' nationalities and language backgrounds. As a result, the actual assistance from the tools for the users is limited.

For the foregoing reasons, there is a need to solve the stated problem by a method and system of generating and detecting confusing phones/syllables automatically.

SUMMARY

An objective of the present invention is to provide a method of generating and detecting confusing phones.

Another objective of the present invention is to provide a system of generating and detecting confusing phones.

To achieve the foregoing objectives, and in accordance with the purpose of the present invention as broadly described herein, the present invention analyzes the pronunciation of non-native Mandarin speakers, identifies possible confusing phones according to the users' language backgrounds, and gives high-level pronunciation suggestions in real-time. Thus, the present invention enhances users' learning experiences by identifying incorrect pronunciation and giving effective pronunciation suggestions.

The method of generating and detecting confusing phones includes a generating stage and a detecting stage. The generating stage includes the following steps: (a) input a Mandarin utterance from a speech file or a microphone; (b) partition the Mandarin utterance into segmented phones/syllables and generate the most likely route in a confusing-phone/syllable-embedded recognition net via Forced Alignment of Viterbi decoding; (c) compare the segmented phones/syllables with a Mandarin acoustic model; (d) determine whether a confusing phone/syllable exists; (e) add the confusing phone/syllable into the recognition net and repeat step (b), (c), and (d) when the confusing phone/syllable exists; (f) stop and output all generated confusing phones/syllables to a confusing phone/syllable file. The detecting stage includes the following steps: (g) input a spoken sentence from a user; (h) align the spoken sentence with a confusing-phone/syllable-embedded recognition net; (i) determine the most likely route of the spoken sentence; and (j) compare the most likely route of the spoken sentence with the target route of the spoken sentence to detect pronunciation error in order to give high-level pronunciation suggestions in real-time.

The system of generating and detecting confusing phones includes a generating system and a detecting system. The generating system includes a confusing-phone/syllable-embedded recognition net, a Mandarin acoustic model, a confusing phone/syllable file, an utterance alignment module, and a confusing phone/syllable generating module. The confusing-phone/syllable-embedded recognition net provides lexicon information during forced alignment of Viterbi decoding. The Mandarin acoustic model provides statistical parameters for acoustic features of all Mandarin syllables. The confusing phone/syllable file stores generated confusing phones. The utterance alignment module segments a Mandarin utterance into segmented phones/syllables and generates the most likely route in the confusing-phone/syllable-embedded recognition net using forced alignment of Viterbi decoding. The confusing phone generating module generates confusing phones by comparing the segmented phones/syllables with the Mandarin acoustic model and computing the probability of a syllable within an utterance with respect to the acoustic models of confusing phones/syllables. If a phone/syllable A is misclassified into other phones/syllables, then these phones/syllables will be the confusing phones/syllables of A. When a confusing phone/syllable exists, add it into the confusing-phone/syllable-embedded recognition net. Also, the utterance alignment module partitions the Mandarin utterance again to obtain better segmented phones/syllables, and outputs the better segmented phones/syllables to the confusing phone/syllable generating module to determine whether a confusing phone/syllable still exists. When a confusing phone/syllable does not exist any more, stop the iterative procedure and output all previously generated confusing phones/syllables to the confusing phone/syllable file.

The detecting system includes the confusing-phone/syllable-embedded recognition net, the utterance alignment module, and a speech assessment module. The confusing-phone/syllable-embedded recognition net is built with the confusing phone/syllable file created by the generating system, and provides lexicon embedded with confusing syllables for detecting error pronunciation in a spoken sentence from a user. The utterance alignment module identifies the most likely route for the spoken sentence with forced alignment of Viterbi decoding. The speech assessment module gives feedback to the user for correcting possible error pronunciation.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
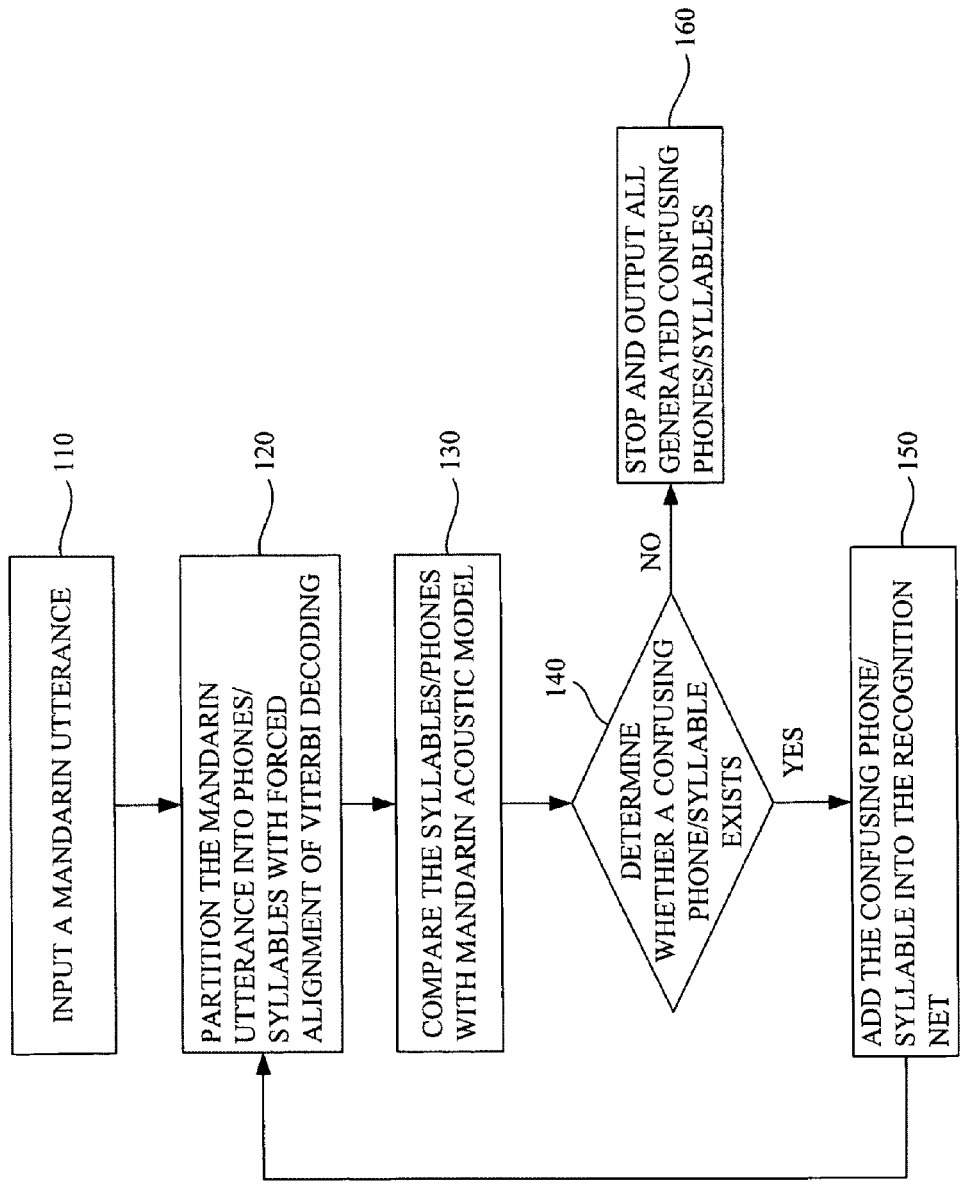
FIG. 1A is a flowchart that shows the steps of generating confusing phones according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
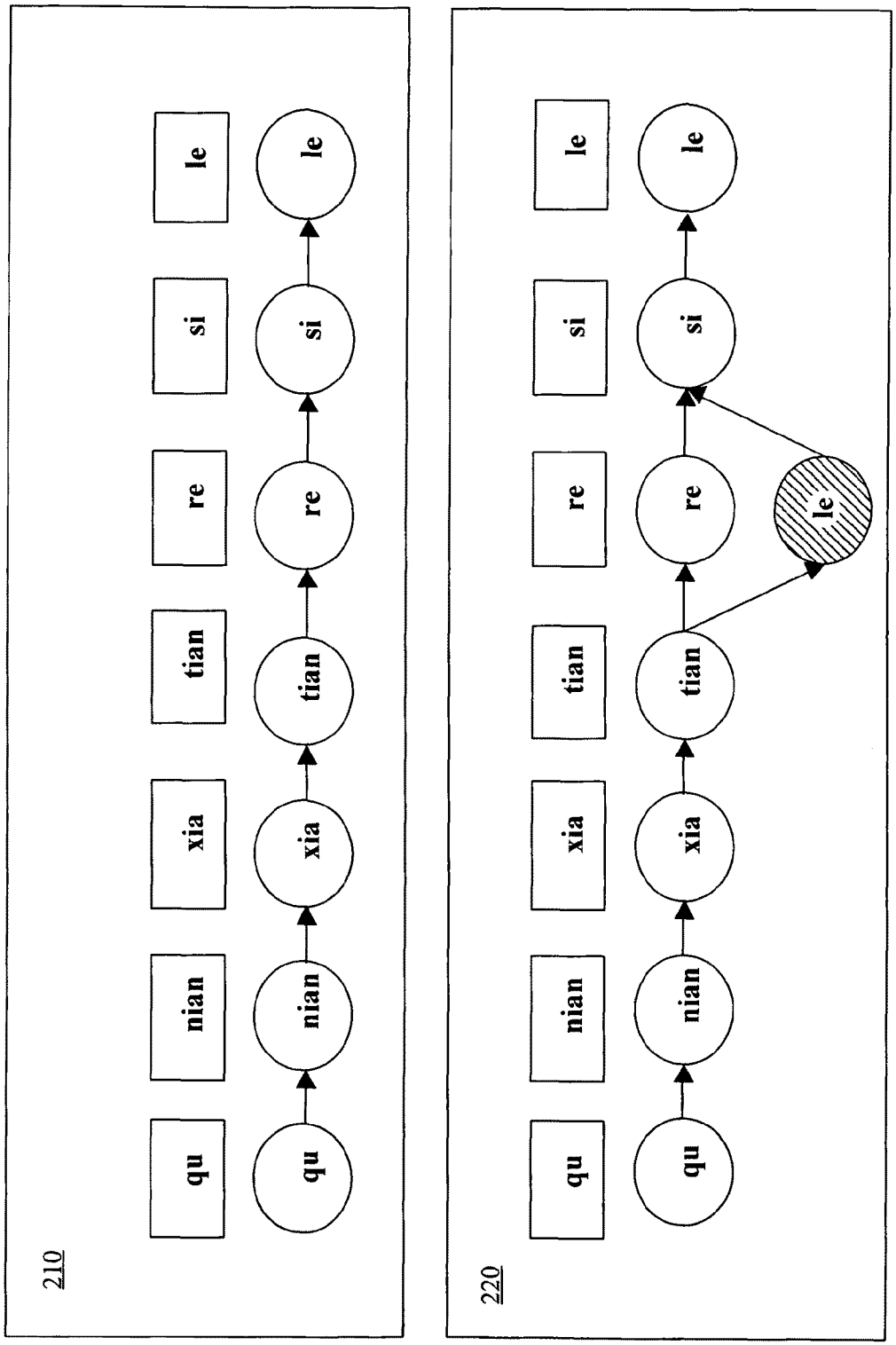
FIG. 2A is a diagram illustrating the confusing-phone/syllable-embedded recognition net at the generating stage of confusing phones/syllables according to one preferred embodiment of this invention.

The method of generating and detecting confusing phones includes a generating stage and a detecting stage. Reference is now made to FIG. 1A and FIG. 2A. FIG. 1A is a flow chart showing the steps of generating confusing phones according to one preferred embodiment of this invention. FIG. 2A is a diagram illustrating the confusing-phone/syllable-embedded recognition net at the generating stage of confusing phones according to one preferred embodiment of this invention. At the generating stage, input a Mandarin utterance from a speech file or a microphone (step 110). Then, partition the Mandarin utterance into phones/syllables (step 120). Step 120 uses forced alignment of Viterbi decoding to partition the Mandarin utterance into the corresponding phone sequences and generate the mostly likely route within the recognition net embedded with confusing phones/syllables. The recognition net initially only includes a single target route, which has the target phonetic alphabets of the Mandarin utterance. For instance, when the Mandarin utterance from the speech file is the pronunciation of the target syllable sequence "qu-nian-xia-tian-re-si-le", initially the recognition net would be constructed with the 7 target Mandarin syllables only: qu-nian-xia-tian-re-si-le. This is shown in state 210 of FIG. 2A. After the utterance is aligned with the target syllable sequence, we have the timing information of each of the segmented syllables in "qu-nian-xia-tian-re-si-le". Then, we can compare the segmented syllables with a Mandarin acoustic model (step 130). The Mandarin acoustic model is a Hidden Markov Model (HMM) that can be used to represent the statistical characteristics of each of the 411 Mandarin syllables. For each of the segmented syllable, compute log probabilities with respect to 411 statistical models of Mandarin syllables and then rank the results based on the log probabilities. A confusing syllable is defined as the Mandarin syllable with the rank higher than the corresponding target Mandarin syllable. So, when there exists a Mandarin syllable α with a rank higher than the target Mandarin syllable β, then α is a confusing syllable of β. In the example Mandarin utterance (FIG. 2C), the target pronunciation of the fifth syllable should be "re"; however, the Mandarin syllable "le" has a high log probability than that of "re". This indicates the pronunciation of the fifth syllable is more like "le" than the target "re". Thus, a confusing syllable "le" is generated and added to the confusing-phone/syllable-embedded recognition net. After identifying a confusing phone/syllable (step 140), we can add the confusing syllable "le" into the recognition net (step 150). At this point, the content of the confusing-phone/syllable-embedded recognition net is as shown in state 220 in FIG. 2A. Since the confusing syllable "le" has been added to the recognition net, there are two possible routes available in the recognition net. Therefore we can repeat steps 120, 130, and 140 until no more confusing phones/syllables are generated. Then stop and output all previously generated confusing phones/syllables to a confusing phone/syllable file when no more confusing phones/syllables are generated (step 160).

Because the confusing phone "le" has been added into the recognition net, the most likely route would be "qu-nian-xia-tian-le-si-le" when repeating step 120 to align the Mandarin speech with the confusing-phone/syllable-embedded recognition net. The forced alignment result for the second time would be more precise than the first time since the confusing syllable has been added to the recognition net. As a result, new confusing syllables might be generated after forced alignment. So, it is necessary to compare the utterance alignment result with the 411 HMMs of Mandarin syllables again and determine whether a confusing phone/syllable still exists. Reference is now made to FIG. 2C, which is a diagram illustrating refined utterance alignment results according to one preferred embodiment of this invention. State 270 illustrates the alignment result of the Mandarin utterance "qu-nian-xia-tian-le-si-le" for the first time, while State 280 illustrates the refined alignment result for the second time using the confusing-phone/syllable-embedded recognition net.

Figure 1B:
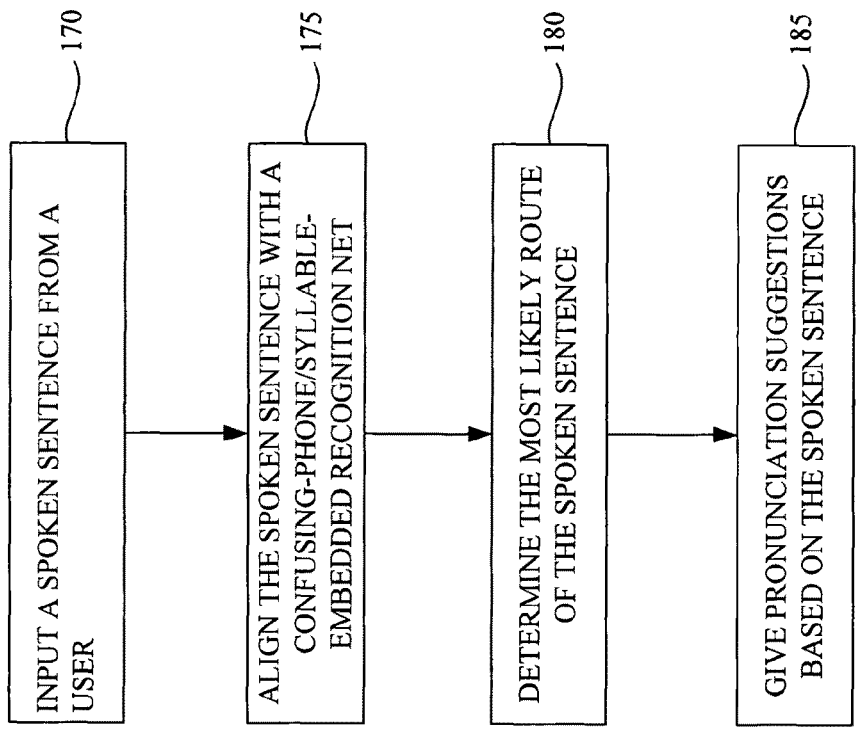
FIG. 1B is a flow chart showing the steps of detecting confusing phones according to one preferred embodiment of this invention.
Figure 2B:
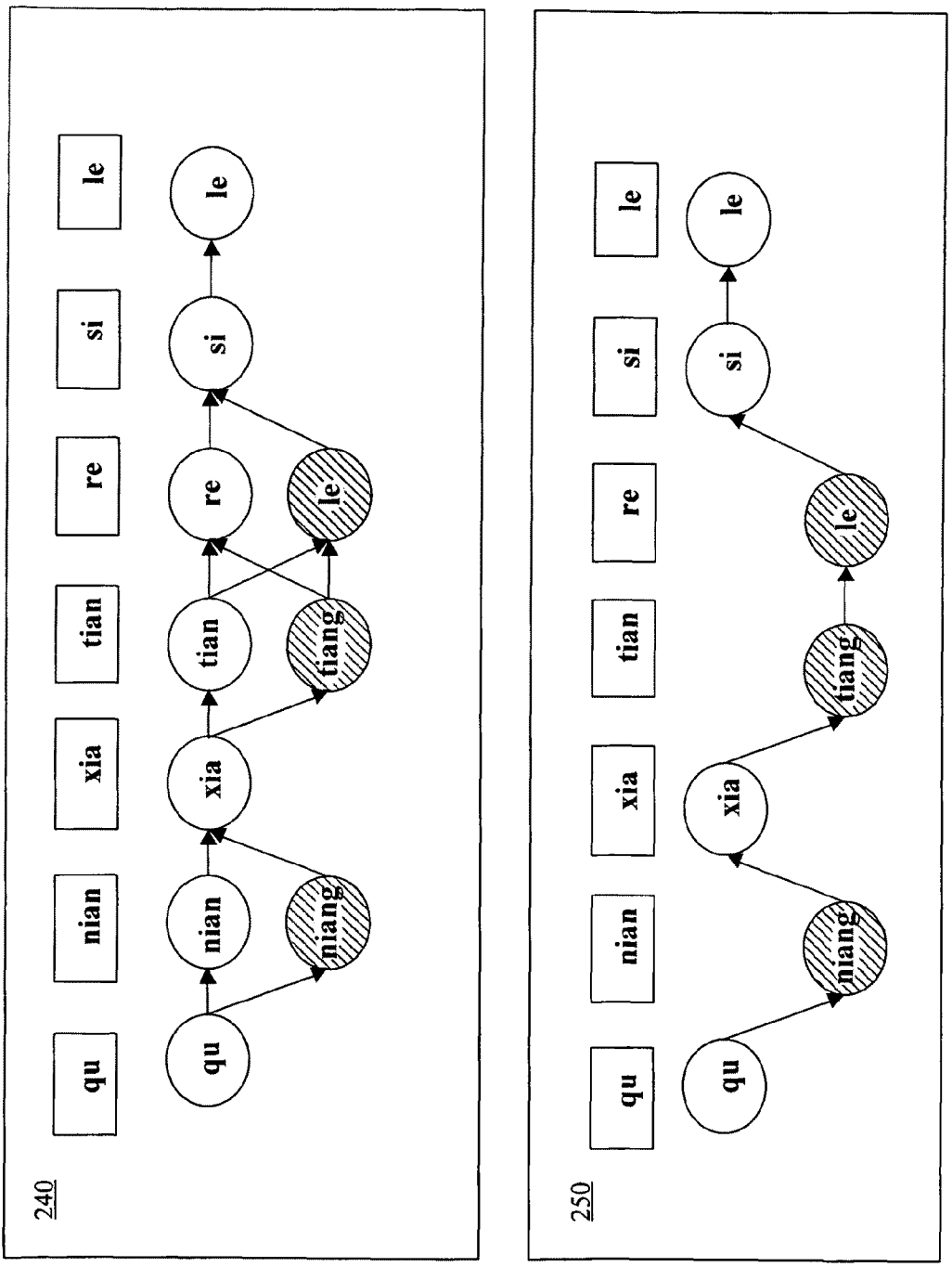
FIG. 2B is a diagram illustrating the most likely route in the confusing-phone/syllable-embedded recognition net at the detecting stage according to one preferred embodiment of this invention.
Figure 2C:
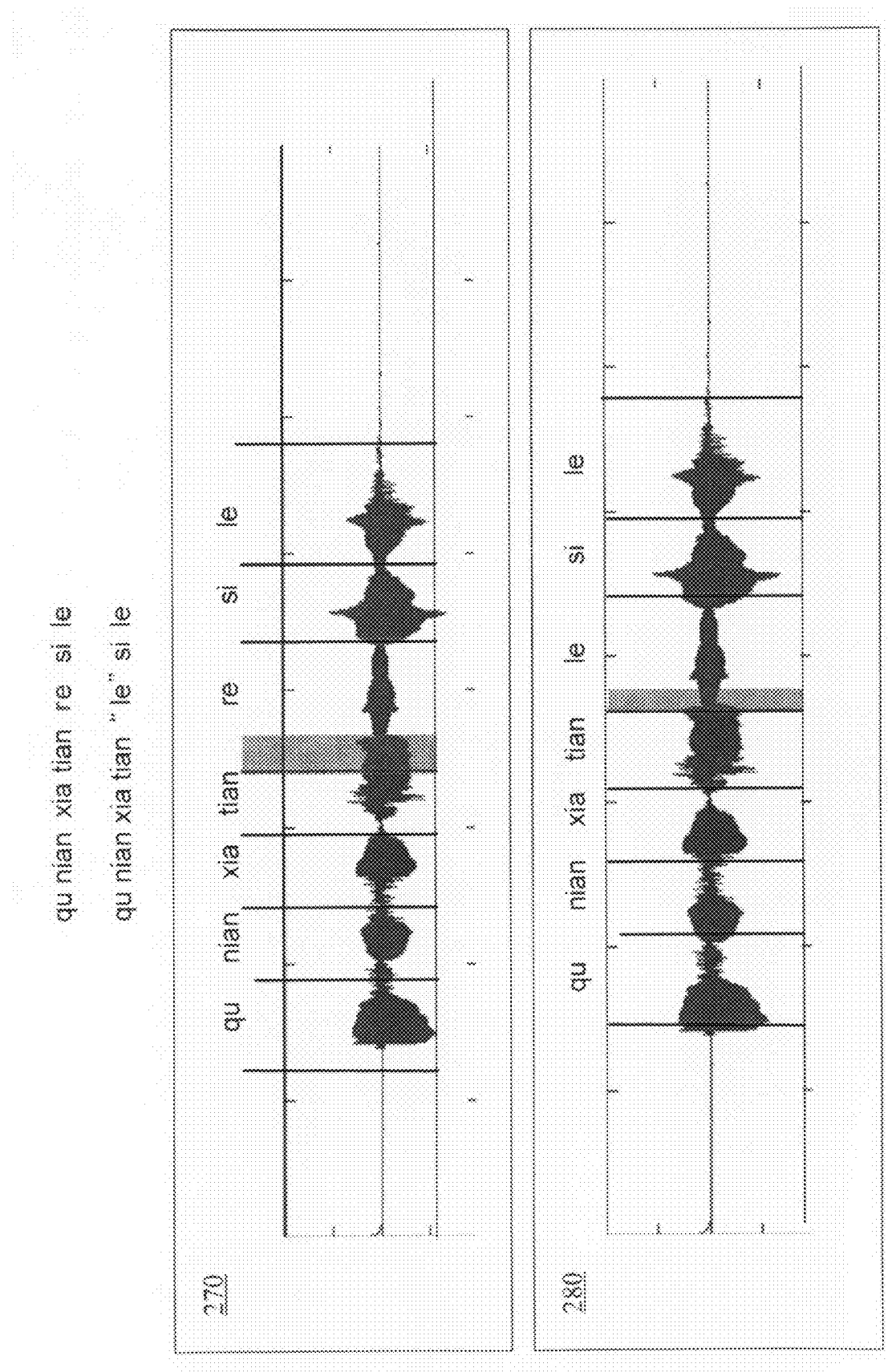
FIG. 2C is a diagram illustrating forced alignment results according to one preferred embodiment of this invention.

Reference is now made to FIG. 1B and FIG. 2B. FIG. 1B is a flowchart showing the steps of detecting confusing phones according to one preferred embodiment of this invention. FIG. 2B is a diagram illustrating the most likely route in the confusing-phone/syllable-embedded recognition net at the detecting stage according to one preferred embodiment of this invention. At the detecting stage, input a spoken sentence from a user (step 170). Then, align the spoken sentence with a confusing-phone/syllable-embedded recognition net (step 175). This step uses Forced Alignment of Viterbi decoding. The confusing-phone/syllable-embedded recognition net is built with the confusing phone/syllable file from the generating stage, and includes those common confusing phones/syllables that most non-native Mandarin learners are likely to have in their pronunciation. As shown in state 240 of FIG. 2B, the confusing-phone/syllable-embedded recognition net for the Mandarin speech "qu-nian-xia-tian-re-si-le" includes confusing syllables "niang", "tiang", and "le". Forced alignment can be used to determine the most likely route of the spoken sentence (step 180). This is shown in state 250 of FIG. 2B, where the most likely route of the spoken sentence is "qu-niang-xia-tiang-le-si-le". Lastly, compare the most likely route of the spoken sentence "qu-niang-xia-tiang-le-si-le" with the target route of the spoken sentence "qu-nian-xia-tian-re-si-le" to give pronunciation suggestions based on the spoken sentence in real-time (step 185). In this particular example, the user incorrectly pronounced "nian" as "niang", "tian" as "tiang", and "re" as "le". In addition to the suggestions, a score for the spoken sentence "qu-niang-xia-tiang-le-si-le" will be given at this step.

Figure 3A:
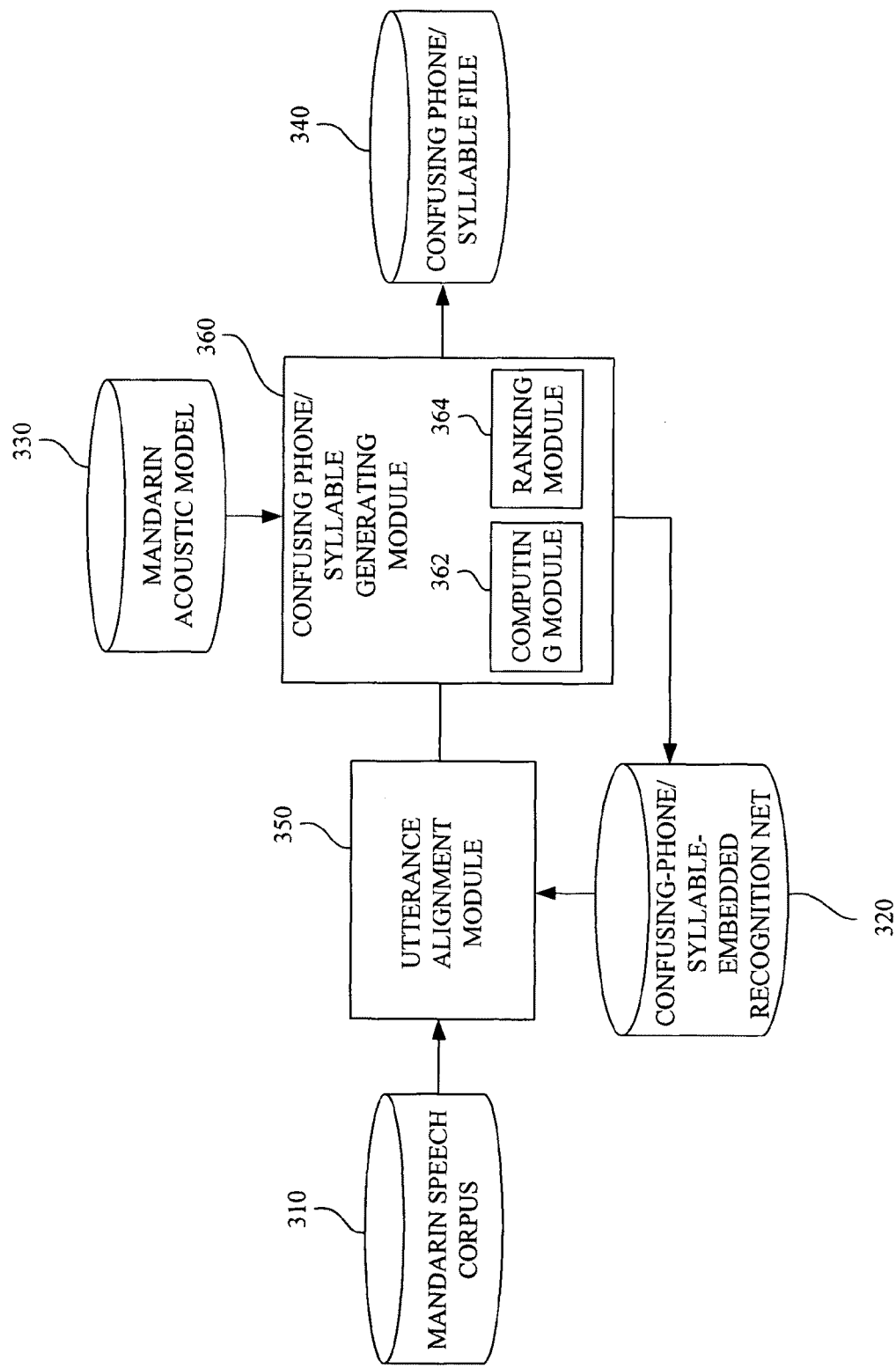
FIG. 3A is a diagram illustrating the generating system of confusing phones/syllables according to one preferred embodiment of this invention.

Reference is now made to FIG. 3A, which is a diagram illustrating the generating system of confusing phones/syllables according to one preferred embodiment of this invention. The generating system includes a Mandarin speech corpus 310, a confusing-phone/syllable-embedded recognition net 320, a Mandarin acoustic model 330, a confusing phone/syllable file 340, an utterance alignment module 350, and a confusing phone/syllable generating module 360. The confusing phone/syllable generating module 360 includes computing module 362 and ranking module 364.

The Mandarin speech corpus 310 stores large quantities of speech samples collected from different Mandarin learners and covers the 411 Mandarin syllables. After inputting an utterance from the Mandarin speech corpus 310, the utterance alignment module 350 partitions the utterance into phones/syllables and generates the most likely route within the recognition net by forced alignment of Viterbi decoding. The recognition net 320 initially includes a single target route only, which has the target contents (in terms of syllable sequences) of the Mandarin utterance. In the confusing phone/syllable generating module 360, the computing module 362 compares the segmented syllables with 411 statistical models of Mandarin syllables in the Mandarin acoustic model 330. Here, the Mandarin acoustic models are in the format of the Hidden Markov Model (HMM). For each of the segmented syllables, the computing module 362 computes the log probabilities with respect to 411 HMMs of Mandarin syllables. Then, the ranking module 364 ranks the 411 syllables based on the values of the log probabilities. A confusing phone/syllable is defined as the Mandarin syllable with a rank higher than the target one. So, when there exists a Mandarin syllable α with a rank higher than the target syllable β, then α is a confusing syllable of β. Namely, syllable β is likely to be incorrectly pronounced as syllable α in Mandarin utterances. When a confusing phone/syllable exists, add the confusing phone/syllable to the recognition net 320, and when a confusing phone/syllable does not exist, stop and output all previously generated confusing phones/syllables to the confusing phone/syllable file 340.

When the confusing phone generating module 360 generates confusing phones and adds the confusing phones to the recognition net 320. The utterance alignment module 350 partitions the Mandarin utterance to generate a possibly different better route within the recognition net 320, and outputs the new set of phones/syllables to the confusing phone generating module 360 to determine if there still exists any confusing phones/syllables.

Figure 3B:
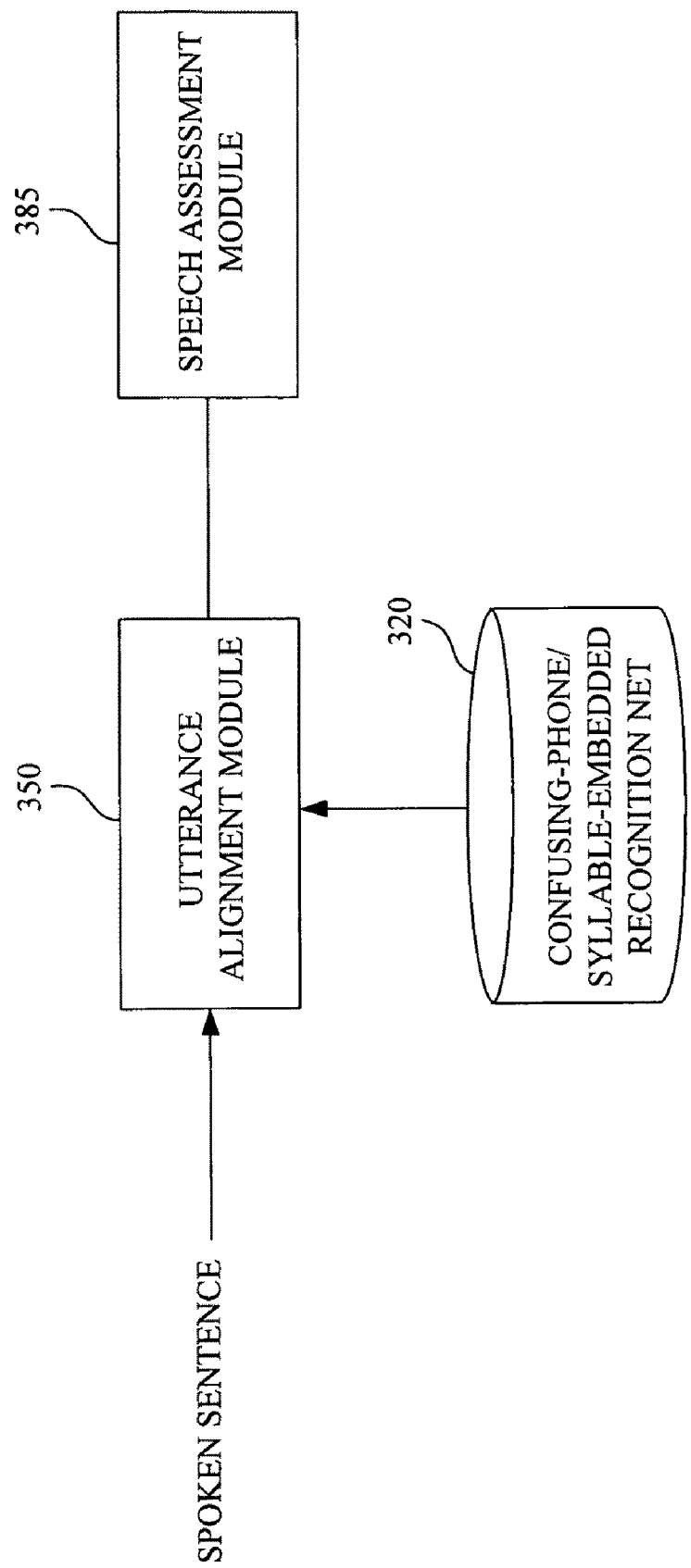
FIG. 3B is a diagram illustrating the detecting system of confusing phones/syllables according to one preferred embodiment of this invention.

Reference is now made to FIG. 3B, which is a diagram illustrating the detecting system of confusing phones according to one preferred embodiment of this invention. The detecting system includes the confusing-phone/syllable-embedded recognition net 320, the utterance alignment module 350, and a speech assessment module 385. The generating system generates common confusing phones that most non-native Mandarin learners have and outputs the common confusing phones to the confusing phone/syllable file 340. For the detecting system, the confusing-phone/syllable-embedded recognition net 320 is built with the confusing phone/syllable file 340 created by the generating system. After inputting a spoken sentence to the utterance alignment module 350, the utterance alignment module 350 identifies the most likely route within the confusing-phone/syllable-embedded recognition net 320 using forced alignment of Viterbi decoding. The speech assessment module 385 gives pronunciation suggestions to the spoken sentence in real-time by comparing the most likely route of the spoken sentence with the target route of the spoken sentence.

The embodiment uses an iterative method to look for confusing phones/syllables and add the confusing phones/syllables into the recognition net repeatedly, which improves the precision of utterance partitioning and the objectivity of scoring. As embodied and broadly described herein, the embodiment analyzes the pronunciation of non-native Mandarin speakers, identifies confusing phones/syllables of pronunciation, and gives suggestions/comments about a spoken sentence in real-time. Thus, the present invention enhances users' learning experiences with immediate feedback in identifying incorrect pronunciation and offering other means for correct pronunciation.

Although the present invention has been described in considerable detail with reference to certain preferred embodiments thereof, other embodiments are possible. Therefore, the spirit and scope of the appended claims should not be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of generating and detecting confusing phones/syllables, comprising:
   providing a generating stage, the generating stage comprising:
   (a) inputting a Mandarin utterance;
   (b) partitioning the Mandarin utterance into a plurality of segmented phones/syllables and generating the most likely route in a confusing-phone/syllable-embedded recognition net via Forced Alignment of Viterbi decoding;
   (c) comparing the segmented phones/syllables with a Mandarin acoustic model, wherein the Mandarin acoustic model comprises a plurality of statistical models of Mandarin syllables;
   (d) determining whether a confusing phone/syllable exists;
   (e) adding the confusing phone/syllable to the confusing-phone/syllable-embedded recognition net and repeating steps (b), (c), and (d) when the confusing phone/syllable exists; and
   (f) stopping and outputting all previously generated confusing phones/syllables to a confusing phone/syllable file when a confusing phone/syllable does not exist;
   providing a detecting stage, the detecting stage comprising:
   (g) inputting a spoken sentence from a user;
   (h) aligning the spoken sentence with the confusing-phone/syllable-embedded recognition net, wherein the confusing-phone/syllable-embedded recognition net is built with the confusing phone/syllable file from the generating stage;
   (i) determining the most likely route of the spoken sentence; and
   (j) comparing the most likely route of the spoken sentence with the target route of the spoken sentence to acquire pronunciation suggestions/comments about the spoken sentence.

2. The method of claim 1, wherein the segmented phones/syllables are time frames with specific starting points and ending points respectively.

3. The method of claim 1, wherein the Mandarin acoustic model is a Hidden Markov Model (HMM).

4. The method of claim 1, wherein the Mandarin acoustic model comprises statistical models of 411 Mandarin syllables.

5. The method of claim 1, wherein the confusing-phone/syllable-embedded recognition net comprises a single target route initially, and the target route has the target contents specific to the Mandarin utterance.

6. The method of claim 1, wherein step (c) comprising:
for each of the segmented phones/syllables, computing a plurality of log probabilities with respect to all of the statistical models of Mandarin syllables;
for each of the segmented phones/syllables, ranking the statistical models of Mandarin syllables based on their log probabilities; and
defining a confusing syllable as the Mandarin syllable with a rank higher than the corresponding target Mandarin syllable of the segmented syllable.

7. The method of claim 1, wherein the method uses an iterative method to look for confusing phones/syllables and add the confusing phones/syllables into the confusing-phone/syllable-embedded recognition net repeatedly, which improves the precision of speech partitioning and the objectivity of scoring.

8. A system of generating and detecting confusing phones/syllables, comprising:
a generating system, comprising:
a confusing-phone/syllable-embedded recognition net for providing lexicon information during forced alignment of Viterbi decoding;
a Mandarin acoustic model providing a plurality of statistical models of Mandarin syllables;
a confusing phone/syllable file for storing generated confusing phones/syllables;
an utterance alignment module inputting a Mandarin utterance, partitioning the Mandarin utterance into a plurality of segmented phones/syllables, and generating the most likely route in the confusing-phone/syllable-embedded recognition net via forced alignment of Viterbi decoding; and
a confusing phones/syllables generating module for generating confusing phones/syllables by comparing the segmented phones/syllables with the Mandarin acoustic model, wherein when a confusing phone/syllable exists, adding the confusing phone/syllable to the confusing-phone/syllable-embedded recognition net, and when a confusing phone/syllable does not exist, stopping and outputting all previously generated confusing phones/syllables to the confusing phone/syllable file;
wherein when the confusing phone/syllable generating module generates a confusing phone/syllable, the utterance alignment module partitions the Mandarin utterance again to obtain a plurality of better segmented phones/syllables, and outputs the better segmented phones/syllables to the confusing phone/syllable generating module to determine whether a confusing phone/syllable still exists;
a detecting system, comprising:
a confusing-phone/syllable-embedded recognition net which provides lexicon embedded with confusing syllables for detecting error pronunciation in a spoken sentence, wherein the confusing-phone/syllable-embedded recognition net is built with the confusing phone/syllable file created by the generating system;
an utterance alignment module for identifying the most likely route for the spoken sentence via forced alignment of Viterbi decoding; and
a speech assessment module for giving suggestions/comments about the spoken sentence.

9. The system of claim 8, wherein the segmented phones/syllables are time frames with specific starting points and ending points respectively.

10. The system of claim 8, wherein the Mandarin acoustic model is a Hidden Markov Model (HMM).

11. The system of claim 8, wherein the Mandarin acoustic model comprises statistical models of 411 Mandarin syllables.

12. The system of claim 8, wherein the confusing-phone/syllable-embedded recognition net comprises a single target route initially, and the target route has the target contents of the Mandarin speech.

13. The system of claim 8, wherein the confusing phones/syllables generating module comprising:
a computing module which computes a plurality of log probabilities, for each of the segmented phones/syllables, with respect to all of the statistical models of Mandarin syllables; and
a ranking module which ranks the statistical models of Mandarin syllables based on the log probabilities for each of the segmented phones/syllables;
wherein a confusing phone/syllable is defined as the Mandarin syllable with a rank higher than the corresponding target Mandarin syllable of the segmented phones/syllables.

14. The system of claim 8, wherein the system uses an iterative method to look for confusing phones and add the confusing phones into the confusing-phone/syllable-embedded recognition net repeatedly, which improves the precision of speech partitioning and the objectivity of scoring.

15. A non-transitory computer usable medium having stored thereon a computer readable program for causing a computer to generate and detect confusing phones/syllables, the program comprising:
providing a generating stage, the generating stage comprising:
(a) inputting a Mandarin utterance;
(b) partitioning the Mandarin utterance into a plurality of segmented phones/syllables with the most likely route within a confusing-phone/syllable-embedded recognition net via forced alignment of Viterbi decoding;
(c) comparing the segmented phones/syllables with a Mandarin acoustic model, wherein the Mandarin acoustic model comprises a plurality of statistical models of Mandarin syllables;
(d) determining whether a confusing phone/syllable exists;
(e) adding the confusing phone/syllable to the confusing-phone/syllable-embedded recognition net and repeating steps (b), (c), and (d) when the confusing phone/syllable exists; and
(f) stopping and outputting all previously generated confusing phones/syllables to a confusing phone/syllable file when a confusing phone/syllable does not exist;
providing a detecting stage, the detecting stage comprising:
(g) inputting a spoken sentence from a user;
(h) aligning the spoken sentence with the confusing-phone/syllable-embedded recognition net, wherein the confusing-phone/syllable-embedded recognition net is built with the confusing phone/syllable file from the generating stage;
(i) determining the most likely route of the spoken sentence; and (j) comparing the most likely route of the spoken sentence with the target route of the spoken sentence to give suggestions/comments about the pronunciation of the spoken sentence.

16. The medium of claim 15, wherein the segmented phones/syllables are time frames with specific starting points and ending points respectively.

17. The medium of claim 15, wherein the Mandarin acoustic model is a Hidden Markov Model (HMM).

18. The medium of claim 15, wherein the Mandarin acoustic model comprises statistical models of 411 Mandarin syllables.

19. The medium of claim 15, wherein the confusing-phone/syllable-embedded recognition net comprises a single target route initially, and the target route has the target contents of the Mandarin utterance.

20. The medium of claim 15, wherein step (c) comprising:

for each of the segmented phones/syllables, computing a plurality of log probabilities with respect to all of the statistical models of Mandarin syllables;

for each of the segmented phones/syllables, ranking the statistical models of Mandarin syllables based on the log probabilities; and defining a confusing phone/syllable as the Mandarin syllable with a rank higher than the corresponding target Mandarin syllable of the segmented phone/syllable.

21. The medium of claim 15, wherein the program uses an iterative method to look for confusing phones/syllables and add the confusing phones/syllables to the confusing-phone/syllable-embedded recognition net repeatedly, which improves the precision of speech partitioning and the objectivity of scoring.

* * * * *